United States Patent [19]

Udelhofen et al.

[11] Patent Number: 4,665,590
[45] Date of Patent: May 19, 1987

[54] CORD RETAINER ASSEMBLY

[75] Inventors: Mark J. Udelhofen, Park Ridge; David T. Flood, Elk Grove Village, both of Ill.

[73] Assignee: Illinois Tool Works Inc., Chicago, Ill.

[21] Appl. No.: 850,826

[22] Filed: Apr. 11, 1986

[51] Int. Cl.[4] ............................................. F16G 11/00
[52] U.S. Cl. ............................... 24/115 H; 24/30.5 R; 24/136 R; 24/117; 403/211
[58] Field of Search ............ 24/115 H, 115 K, 115 M, 24/117, 136 R, 136 K, 136 L, 30.5 R, 30.5 L; 403/211

[56] References Cited

U.S. PATENT DOCUMENTS

| 432,539 | 7/1890 | Mains | 24/30.5 R |
| 671,074 | 4/1901 | White | 403/211 X |
| 3,132,390 | 5/1964 | Boden | 24/117 R X |
| 3,861,003 | 1/1975 | Boden | 24/136 R |
| 4,035,877 | 7/1977 | Brownson et al. | 24/196 X |
| 4,156,574 | 5/1979 | Boden | 24/115 M X |

FOREIGN PATENT DOCUMENTS 808924 5/1951 Fed. Rep. of Germany ...... 403/211

Primary Examiner—Peter A. Aschenbrenner
Assistant Examiner—Laurie K. Cranmer
Attorney, Agent, or Firm—J. P. O'Brien; T. W. Buckman

[57] ABSTRACT

A cord retainer assembly constructed of two cooperating parts: a cord holder part and a cord lock part. The cord holder part is molded as a one-piece plastic elongate housing having a tapered nose portion with two spaced apart apertures formed at one end and having a central opening formed at the other end. The cord lock part is formed of a one-piece plastic elongate slider member which is conformably shaped to be slidably disposed within the hollow housing and has a handle portion which extends outwardly of its central opening. The slider member is formed with a pair of laterally extending gripping teeth for selectively restraining a length of cord which is threaded through the housing. The slider member is releasably latched within the housing member by a ratcheting mechanism composed of a plurality of serrated teeth formed longitudinally along an inside surface of the housing which mate with a second plurality of serrated teeth formed longitudinally along the slider member. A release means is provided for selectively disengaging the second plurality of teeth from the first plurality of teeth to permit the slider movement to be displaced outwardly of the housing and thereby free the gripping force on the length of cord threaded through the housing.

8 Claims, 8 Drawing Figures

CORD RETAINER ASSEMBLY

BACKGROUND OF THE INVENTION

This invention relates to a cord retainer assembly that selectively grips a cord in two positions to provide a retention means for closing a bag.

The use a pair of laterally extending cord engaging members which cooperate with the interior walls of a housing to engage the cord and lock in place is old in the art as shown in U.S. Pat. No. 3,897,161. These prior art devices are quite adequate for locking a cord of a small bag. However, they do not have adequate strength for holding larger bags.

This invention overcomes the prior art disadvantages by providing a positive locking arrangement between the cord holder housing and the slider to maintain a tight gripping force on the cord until the slider member is selectively released. This strong locking arrangement is accomplished by use of a ratcheting lock mechanism comprising cooperating teeth formed on the inside surface of a cord holder housing and on the slider member which ratchet together as the slider is pushed into a cord gripping position. To release the grip on the cord it is necessary to disengage the ratcheting lock mechanism by separating the cooperating ratcheting teeth.

Another feature of this invention is to provide a stop means for limiting the displacement of the slider member relative to the housing member to prevent its total disengagement therefrom.

Other objects, features and advantages of the invention will be more readily appreciated upon consideration of the following detailed description of the invention together with the accompanying drawing.

DESCRIPTION OF PREFERRED EMBODIMENT

Figure 1:
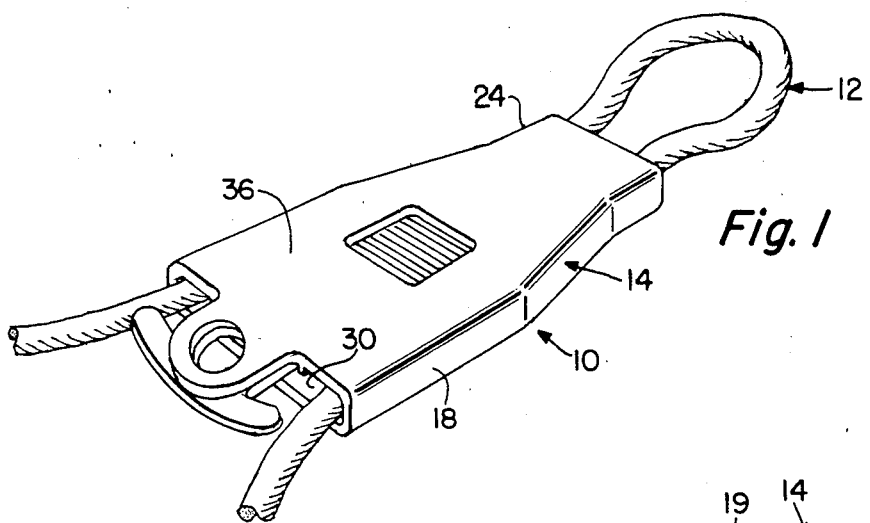
FIG. 1 is a perspective view showing the preferred embodiment of this invention with a length of cord threaded through the cord holder housing.

There is depicted in FIG. 1 a cord retainer assembly generally designated by the reference numeral 10 which is illustrated with a loop of cord 12.

Cord retainer assembly 10 is constructed of a cord holder part 14 and a cord lock part 16. The cord holder part 14 is shown as a one-piece molded plastic elongate housing 18. Elongate housing 18 is constructed by securing together two mating half parts 19 and 20. When the two half parts 19 and 20 are secured together, as by sonic welding, there is defined a housing 18 having an elongate interior chamber 22. The elongate housing 18 has a tapered nose portion 24 at one end which is formed with two spaced apart apertures 26,28 in communication with the chamber 22. Across the widened end portion of the housing 16 is formed a long narrow opening 30. The two apertures 26 and 28 are defined by a U-shaped wall member 34 (FIGS. 3 and 7) which is integrally formed on the upper wall 36 of upper half part 20.

Figure 4:
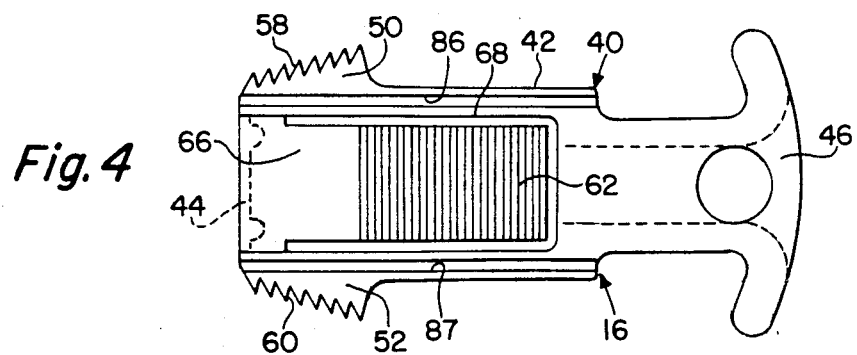
FIG. 4 is a top plan view of a slider member as depicted in FIG. 1.
Figure 5:
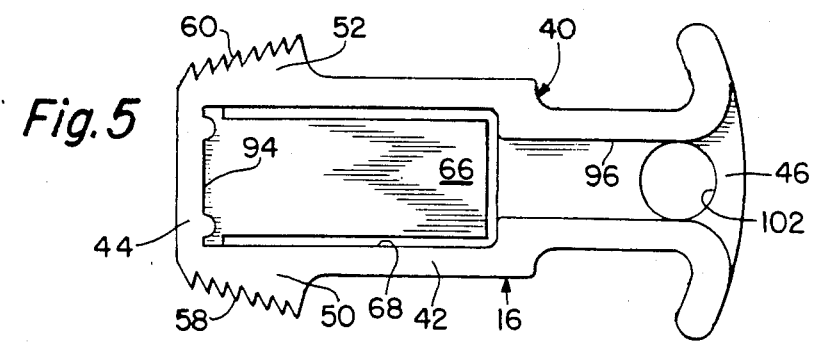
FIG. 5 is the bottom plan view of the same slider member.

Cord lock part 16 is depicted in FIGS. 4 and 5 as a one-piece slider member 40. Slider member 40 is preferably formed of a resilient plastic material in the shape of an elongate body 42 having a nose portion 44 at one end and a handle portion 46 at the other end. The elongate body 42 of slider member 40 is shaped to conform to the configuration defined by the chamber 22 so that it can be slidingly disposed through the housing opening 30. As the slider member 40 is displaced towards the tapered nose portion 24 of housing 16, a pair of laterally-extending wing sections 50 and 52 converge with the inside lateral wall surfaces 54 and 56 of elongate chamber 22, respectively.

Figure 7:
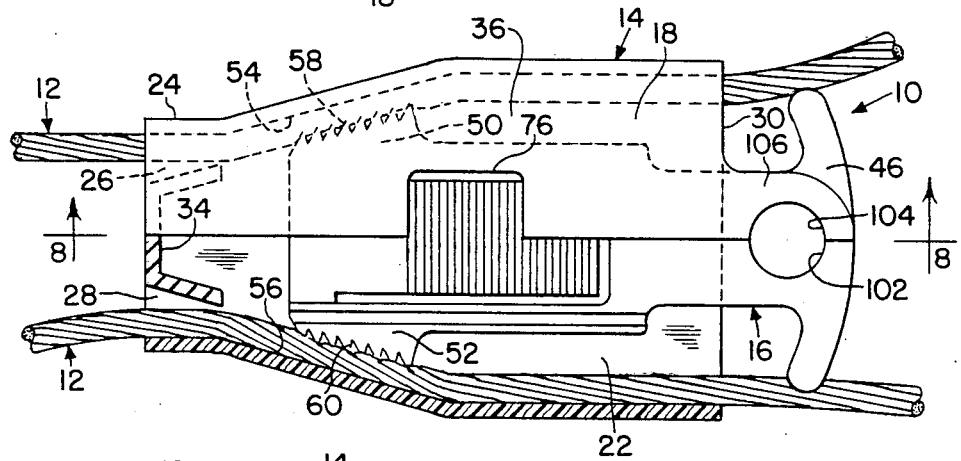
FIG. 7 is a top plan view of the invention depicted in FIG. 1 showing a portion of the top wall member broken away to illustrate the cooperating action between the housing and slider member.

As depicted in FIG. 7, the inward displacement of slide member 40 cause the plurality of teeth 58 and 60 formed on lateral wing sections 50 and 52, respectively, to engage and grip the length of cord 12 threaded through the housing 16.

Figure 3:
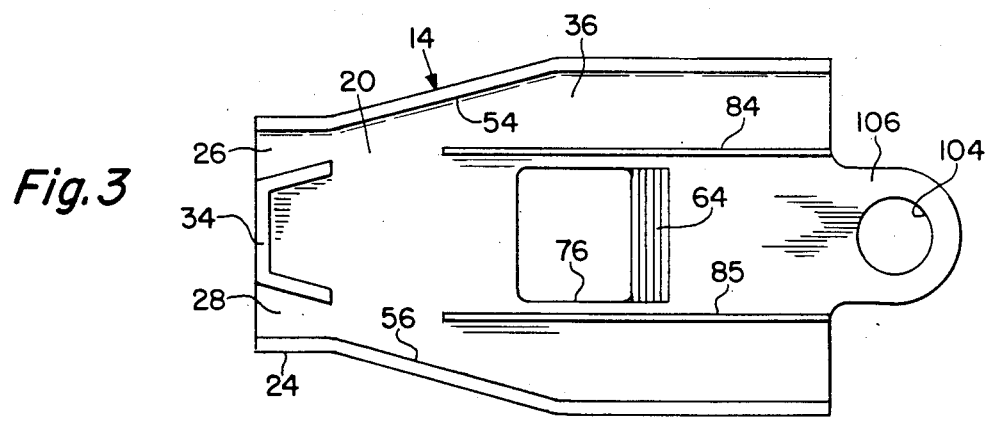
FIG. 3 is an inside view of the top half portion of the cord holder housing illustrated in FIG. 1.

To hold the slide member 40 in a locked position once the plurality of teeth 58 and 60 engage and grip the length of cord 12, there is provided a plurality of serrated teeth 62 (FIG. 4) formed on slider member 60 which mate together with a plurality of teeth 64 integrally formed on the wall surface 36 of half part 20 (FIG. 3).

To permit teeth 62 to ratchet over teeth 64, teeth 62 are formed on one side of flexible lever arm 66 which is integrally attached at one end to the nose portion 44 of slider member 40. The flexible lever arm 66 has a generally rectangular configuration which is normally disposed within a slightly larger rectangular opening 68 formed in the mid section of the slider member 40.

Once the slider member is locked into the cord holding position illustrated in FIG. 7, it will retain cord 12 in a tight interengaging relationship with respect to housing 14. To disengage the slider member 40, there is provided a means for disengaging the serrated teeth 62 from the serrated teeth 64. This disengagement is made possible by providing an aperture 76 adjacent to the serrated teeth 64 on wall surface 36 (FIG. 3). The opening 76 allows the user to press directly against the lever arm 66 and flex its free end away from wall surface 36 to cause serrated teeth 62 to disengage from serrated teeth 64. Simultaneously with this disengagement, handle 46 can be pulled outwardly of the housing 14 to free the loop of cord 12.

Figure 2:
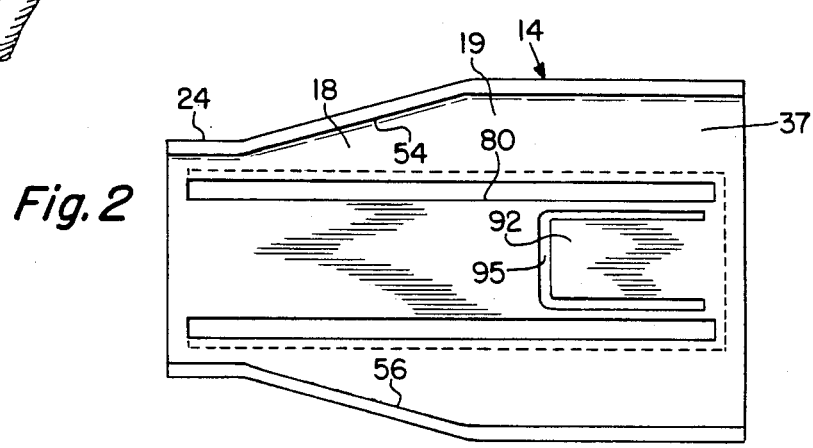
FIG. 2 is an inside view of the bottom half portion of the cord holder housing illustrated in FIG. 1.

To permit the outward flexing of lever arm 66, housing 14 is provided with a flexible strip 80 which is attached at its opposite ends to the wall surface 37 of half part 19 (FIG. 2). When the two half parts 19 and 20 are assembled together, the mid-section of flexible strip 80 is in direct alignment with the aperture 76. Thus it will be understood that the outward displacement of flexible lever arm 66 away from the serrated teeth 64 will cause the middle portion of the flexible strip 80 to bend outwardly of housing 14 a sufficient amount to permit the free end of flexible arm member 66 to have its teeth 62 disengage from teeth 64.

To guide the slider member 40 in a straight path along the longitudinal axis of housing 14, there is provided a pair of guide rails 84 and 85 integrally formed on wall surface 36 of half part 20 in a general parallel direction to the longitudinal axis of housing 14. Slider member 40 has a pair of conforming parallel grooves 86 and 87 that are spaced apart the same distance as rails 84 and are adapted to slide along the rails to guide the slider member 40 in a straight path.

Slider member 40 is prevented from being totally withdrawn from the housing 14 by virtue of stop means 90. Stop means 90 is formed by the cooperating relationship between resilient tongue member 92, located along the longitudinal axis of housing 14 in the half part 19 (as depicted in FIG. 2) and abutment shoulder 94, located adjacent the tapered nose portion 44 of slider member 40 as depicted in FIG. 5. Tongue member 92 is fixed adjacent the widened end portion of half housing part 19 with its free end 95 disposed inwardly of the chamber 22. With this angular disposition of tongue 92, its forward free end 95 is normally positioned to ride within the boundaries of aperture 68 and behind flexible arm 62.

Figure 6:
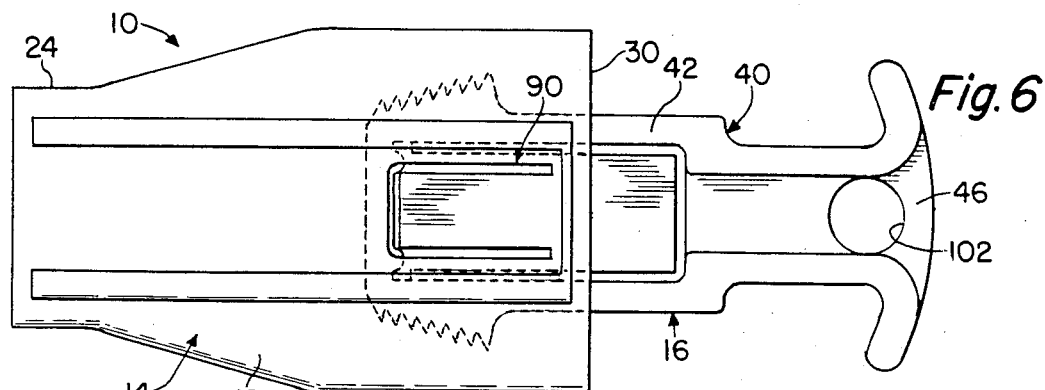
FIG. 6 is a bottom plan view of the invention depicted in FIG. 1.
Figure 8:
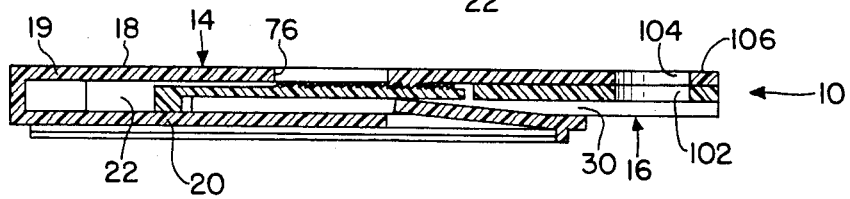
FIG. 8 is a cross sectional view of FIG. 7 taken along the line 8—8 and looking in the direction of the arrows.

As will be appreciated from FIG. 8, when handle portion 46 is pulled to withdraw slider member 40 out of housing 14, abutment shoulder 94, provided at the forward end of aperture 68, will be brought into engagement with free end 95 of tongue 92, as depicted in FIG. 6.

The cord retainer assembly 10 is ideal for use as a cord closure for large bags, such as laundry bags or mail bags. To seal off such a bag, the two ends of its cord are threaded through the housing 14 in the manner depicted in FIG. 1. Housing 14 is positioned directly against the closed off bag opening, and slider member 40 is pushed inwardly of the housing 14 until teeth 58 and 60 engage and grip the portion of the cord as depicted in FIG. 7.

As the slider member 40 is slid towards narrow nose portion 24 of the housing 14, serrated teeth 62 on the flexible arm 66 of slider member 40 ratchet over the teeth 64 on wall surface 36 of housing 14. With slider member 40 in the cord locking position of FIG. 7, the cord retainer housing can be prevented from being unlatched by inserting a pad lock through the aligned apertures formed by opening 102 in handle member 46 and opening 104 provided in the eyelet extension 106 of part 20 (FIG. 3) for housing 14.

To unlatch cord retainer assembly 10, the pad lock would be first removed. Then the user inserts a finger through aperture 76 and depress the free end 62 of lever arm 66 a sufficient distance to disengage mating teeth 62 from teeth 64. While maintaining this depressed action, the handle member 46 is withdrawn from the housing 10 until it reaches the stop position of FIG. 6. In the position of FIG. 6, free end 95 of tongue 92 engages abutment 94 on slider member 40 to prevent the slider member from being further withdrawn from the housing.

In the position of FIG. 6 the length of cord 12 can be readily withdrawn from the housing 14.

It will be appreciated that both the housing 14 and the slider member 40 can be made of a variety of materials. There are however advantages to making the two parts of thermoplastic material since it would make them non-corrosive and could be readily assembled as two molded parts.

While a preferred embodiment has been shown and described herein it is not desired to limit the invention thereto, changes and modifications may occur to those skilled in the art, and such changes form a part of this invention insofar as they fall within the spirit and scope of the appended claims.

I claim:

1. Cord retainer assembly comprising a cord holder part and a cord lock part, said cord holder part comprising an elongate hollow housing having a tapered nose portion at one end and having two spaced apart apertures through said one end and a central opening through its other end; said cord lock part comprising an elongate slider member slidably disposed inside said hollow housing and extending through said central opening, said slider member having a pair of lateral gripping means for selectively holding a length of cord against two spaced apart wall segments formed on an interior wall surface area of said tapered nose portion of said hollow housing; a first plurality of serrated teeth formed longitudinally along an inside surface of said hollow housing at a location intermediate between said ends of said hollow housing, a second plurality of serrated teeth formed longitudinally along said slider member at a location to cooperatively mate with said first plurality of serrated teeth as said pair of lateral gripping means approaches said inside surface of said tapered nose portion, and means for selectively disengaging said first and second plurality of mating teeth to permit the movement of said slider to said central opening for freeing the gripping force on a cord threaded through said hollowing housing, said slider member includes an elongate plate portion slidingly disposed inside said elongate housing with a pair of tapered lateral wings at the one end and a handle portion integrally formed with other end of said plate portion, said handle portion extending beyond said elongate housing, and wherein said pair of lateral gripping means comprises a plurality of laterally extending teeth integrally formed on opposite lateral sides of said tapered nose of said elongate plate portion, said elongate plate portion of said slider member includes a central opening, a flexible lever arm having one end attached to said slider member adjacent said one end and having a free end at its other extremity, said lever arm being normally disposed within said central opening, and wherein said second plurality of serrated teeth is formed along said free end of said lever arm, and said means for selectively disengaging said first and second plurality of mating teeth comprises an aperture formed through said elongate housing adjacent said first plurality of teeth to permit the selective displacement of said free end of said lever arm away from said first plurality of serrated teeth a sufficient distance to disengage said first and second plurality of mating teeth.

2. Cord retainer assembly as defined in claim 1, further comprising stop means for limiting the extent of movement of said slider member away from said tapered nose portion of said elongate hollow housing.

3. Cord retainer assembly as defined in claim 2, wherein said stop means comprises a longitudinally extending flexible finger attached adjacent to said other end of said hollow housing and an abutment formed on said one end of said slider in a location disposed to engage the free end of said flexible finger whenever said slider member is pulled outwardly of said elongate housing.

4. Cord retainer assembly comprising a cord holder part and a cord lock part, said cord holder part comprising a one-piece plastic molded elongate hollow housing having identical cross sectional shape on opposite sides of its longitudinal axis, having a tapered nose portion at one end and having two spaced apart apertures formed through said one end on opposite sides of said longitudinal axis and a central opening formed through its other end; said cord lock part comprising a one-piece plastic molded elongate slider member slidably disposed inside said hollow housing and extending through said central opening, said slider member having an elongate flat plate portion with a pair of lateral wings integrally formed at its forward end, said pair of lateral wings shaped to conform to two spaced apart wall segments formed on the inside wall surface area of said tapered nose portion of said hollow housing, and a plurality of outwardly extending teeth integrally formed along an outside surface of said lateral wings, a first plurality of serrated teeth formed longitudinally along an inside surface of said hollow housing, a second plurality of serrated teeth formed longitudinally along said slider member at a location to cooperatively mate with said first plurality of serrated teeth as said lateral gripping means approaches said two spaced apart wall segments, and means for selectively disengaging said first and second plurality of mating teeth to permit the movement of said slider to said central opening for releasing the gripping force on a cord threaded through said hollow housing, said elongate flat plate portion of said slider member including a central opening and a flexible lever arm having one end attached adjacent said forward end and having a free end at its other extremity, said lever arm being normally disposed within said central opening, and wherein said second plurality of serrated teeth is formed along said free end of said lever arm, said means for selectively disengaging said first and second plurality of mating teeth comprising an aperture formed through said elongate housing adjacent said first plurality of teeth to permit the selective displacement of said free end of said lever arm away from said first plurality of serrated teeth a sufficient distance to disengage said first and second plurality of mating teeth.

5. Cord retainer assembly as defined in claim 4, further comprising stop means for limiting the movement of said slider member away from said tapered nose portion of said elongate hollow housing.

6. Cord retainer assembly as defined in claim 5, wherein said stop means comprises a longitudinally extending flexible finger attached to said other end of said hollow housing and an abutment formed on said one end of said slider in a location to engage the free end of said flexible finger whenever said slider member is pulled outwardly of said elongate housing.

7. Cord retainer assembly as defined in claim 4, wherein said elongate hollow housing is formed with parallel inside wall surfaces spaced apart a slight distance greater than the thickness of said elongate flat plate portion of said slider member, said first plurality of serrated teeth formed longitudinally along one of said inside wall surfaces at its mid-section and an elongate flexible strip integrally formed longitudinally along the mid-section of the other of said inside wall surface having its opposite lateral edges unattached such that the mid-portion of said flexible strip will flex outwardly to accommodate the displacement of said free end of said lever arm away from said first plurality of serrated teeth.

8. Cord retainer assembly as defined in claim 4, further comprising means for guiding said slider member along said longitudinal axis of said hollow housing.

* * * * *